(12) United States Patent
Lockery et al.

(10) Patent No.: US 6,504,114 B1
(45) Date of Patent: Jan. 7, 2003

(54) DOUBLE BENDING BEAM LOAD CELL

(75) Inventors: Harry E. Lockery, Sudbury, MA (US); Robert L. Gray, Wayland, MA (US)

(73) Assignee: Flintec, Inc., Hudson, MA (US)

( * ) Notice: Subject to any disclaimer, the term of this patent is extended or adjusted under 35 U.S.C. 154(b) by 48 days.

(21) Appl. No.: 09/642,645

(22) Filed: Aug. 22, 2000

(51) Int. Cl.[7] .............................. G01G 3/08; G01L 1/04; G01L 1/22

(52) U.S. Cl. .............. 177/229; 73/862.634; 73/862.639

(58) Field of Search ..................... 177/229; 73/862.634, 73/862.639

(56) References Cited

U.S. PATENT DOCUMENTS

| | | | |
|---|---|---|---|
| 2,866,059 A | 12/1958 | Laimins | 177/229 |
| 3,512,595 A | 5/1970 | Laimins | 177/229 |
| 5,076,376 A | 12/1991 | Bizet et al. | 177/229 |
| 6,225,576 B1 * | 5/2001 | Poole et al. | 177/211 |

* cited by examiner

*Primary Examiner*—Randy W. Gibson

(57) ABSTRACT

A precision double bending beam load cell made at low cost by using load cell quality material in the bending beams only, while less costly material is used for end blocks to maintain the beams in a predetermined parallel relationship and to mount the load cell, provided that the joints between the beams and the end blocks are slip free. Slip free joints can be obtained by making the end blocks in the form of rods with necks press fitted into matching holes at the ends of the beams, or by laser welding or hard soldering metal end blocks to metal bending beams. Plastic end blocks can also be injected molded onto the ends of bending beams with holes and scalloped edges for the injection molded plastic to grip onto. Shrinkage or expansion of the plastic material during the curing process will then make the joints pre-stressed and slip free.

7 Claims, 4 Drawing Sheets

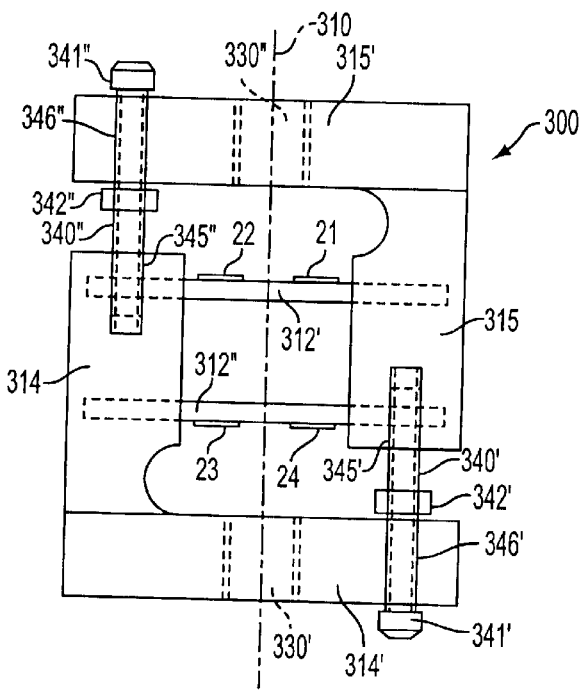
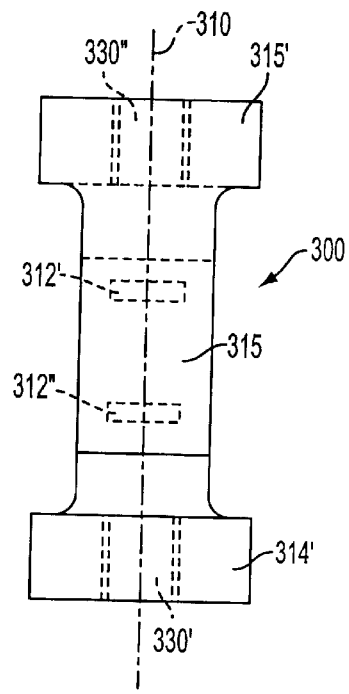
FIG. 10  FIG. 11
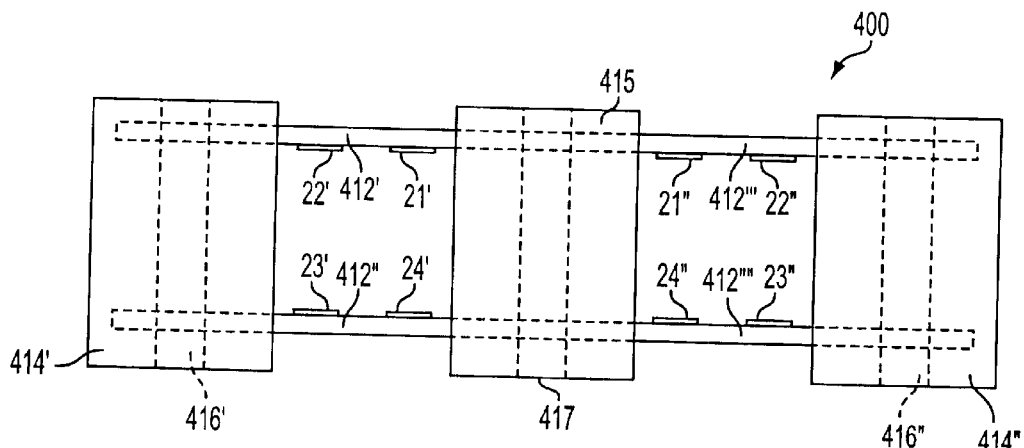
FIG. 12
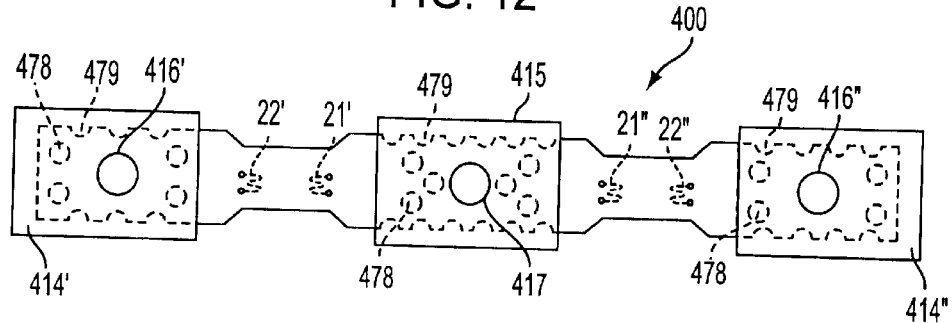
FIG. 13

DOUBLE BENDING BEAM LOAD CELL

BACKGROUND OF THE INVENTION

1. Field of the Invention

The present invention relates to strain gage load cells for weighing, and specifically to a new design for double bending beam load cells, also known as "Single Point Load Cells".

2. Description of the Related Art

Known double bending beam load cells are made from blocks of special load cell quality aluminum or steel alloy with a cut-out in the middle forming parallel top and bottom bending beams connected by solid end blocks. One of the end blocks is bolted to a base so the bending beams extend from the base as cantilevers, and the second block is adapted to receive a load that will cause the two bending beams to bend, each forming an S-shaped curve. Strain gages bonded to the bending beams on each side of their inflection points are connected in a strain gage bridge used to sense the load on the load cell. Such double bending beam load cells have been used extensively in the art for several decades, and are widely described in the patent literature. See for example U.S. Pat. Nos. 2,866,059 and 3,512,595.

The load cell material for high accuracy load cells is expensive, and the machining of the central cut-out is costly, so attempts have been made to lower the cost of double bending beam load cells by bolting separate bending beams to end blocks of less costly metal. Such devices are described in U.S. Pat. No. 5,076,376 issued to Bizet et al. These prior art load cells are inexpensive, but the bolted joints rely solely on friction between bending beams and end blocks, so the joints are subject to slip under shear stress. Shear stress between end blocks and beams is what forces a double bending beam load cell to deform as a parallelogram under load, with the end blocks remaining vertical and the beams flexing in parallel S-shapes. Any slip in these joints will change the load cell geometry and cause measurement errors. These prior art double bending beam load cells accordingly suffer from hysteresis, creep, and lack of repeatability, so they have not found acceptance in the high precision load cell market.

SUMMARY OF THE INVENTION

An object of the present invention is to provide a high accuracy double bending beam load cell that is inexpensive to make.

Another object is to provide an inexpensive double bending beam load cell that does not suffer from significant creep or hysteresis.

These objects are obtained by a double bending beam load cell comprising two parallel bending beams of load cell quality material, at least two separate end blocks of less expensive material to maintain a fixed spacing between said bending beams, and slip free joints to join said end blocks and said bending beams.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a side view of an in-line load cell according to a preferred embodiment of the invention.

FIG. 11 is an end view of the load cell shown in FIG. 10.

FIG. 12 is a side view of a double ended load cell according to a preferred embodiment of the invention.

FIG. 13 is a top view of the load cell shown in FIG. 12.

DETAILED DESCRIPTION OF PREFERRED EMBODIMENTS

Reference will now be made in detail to the present preferred embodiments of the invention, examples of which are illustrated in the accompanying drawings.

Figure 1:
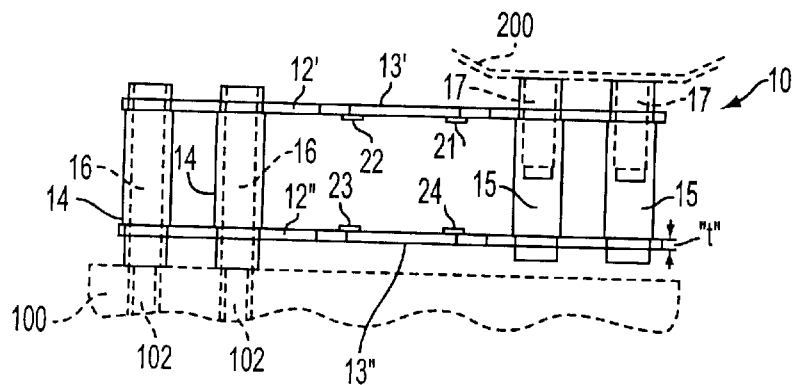
FIG. 1 is a lateral view of a load cell according to a first preferred embodiment of the invention.
Figure 2:
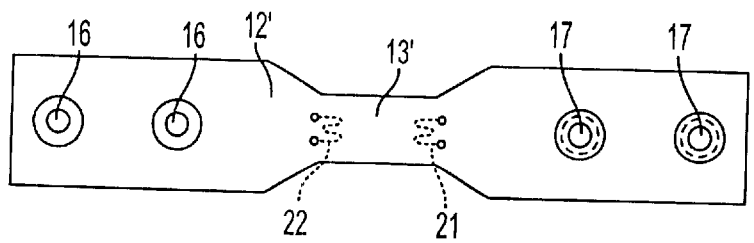
FIG. 2 is a top view of the load cell shown in FIG. 1.

FIGS. 1 and 2 show two different views of a load cell 10 according to a first preferred embodiment of the invention. The load cell 10 comprises a pair of bending beams 12 with narrow center sections 13, namely two flat upper and lower bending beams 12' and 12" with narrowed center sections 13' and 13" respectively, held together at a fixed distance from each other by two pairs of end blocks 14 and 15 near the ends of the beams 12', 12". The end blocks 14 are hollow, and provide through holes 16 for bolts (not shown) for mounting the load cell 10 on a base 100 via threaded holes 102. End blocks 15 are provided with threaded holes 17 for mounting of a load platform 200. Of course, while holes 17 are commonly threaded they could also be non-threaded and the load platform 200 secured by a through bolt with a nut on the bottom thereof.

Strain gages 21 and 22 are bonded to the underside of the upper bending beam 12', near the ends of the narrow central part 13, and strain gages 23 and 24 are similarly bonded to the top side of the lower bending beam 12", as is common in the art. When a load is applied to the load platform 200, the cantilevered load cell 10 will flex so the bending beams 12' and 12" form shallow S-shapes. This causes strain gages 21 and 23 to sense tensile strain, and strain gages 22 and 24 to sense the same amount of compressive strain. A strain gage bridge containing the four strain gages 21–24 will thus become unbalanced and provide an output voltage proportional to the load on the load platform 200. If all four strain gages 21–24 are accurately placed and have the same sensitivities, the output from the bridge will be independent of the location of the load on the load platform 200. The strain gages may also be mounted on the other sides of beams 12', 12", as is well known in the art, but they are better protected when mounted as shown in FIGS. 1 and 2.

Figure 3:
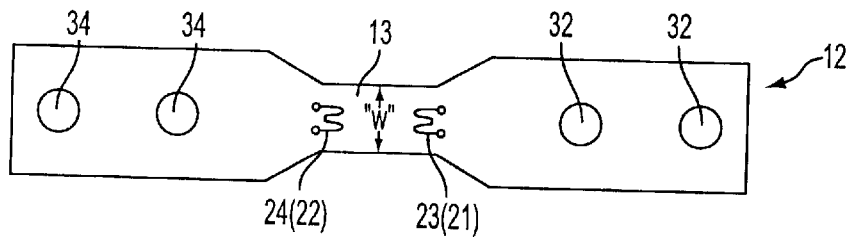
FIG. 3 is a top view of one bending beam for the load cell shown in FIGS. 1 and 2.

The beams 12', 12" are cut by stamping or milling to a shape as shown in FIG. 3 from a sheet of aluminum alloy or stainless steel with properties suitable for precision strain gage load cells. The end blocks 14 and 15 are made from rods or extrusions of a less costly aluminum or steel alloy, and are shaped as shown in FIGS. 4A, 4B in a screw cutting machine or a lathe.

The end blocks 14, 15 have similar outside shapes. At one end, the end blocks have head sections 41 designed to contact the base 100 and the load platform 200, respectively. Next to the head section 41 are neck sections 42 sized to provide press fits in large holes 32 in one end of the beams 12', 12". At the other end of the end blocks 14, 15 there are neck sections 44 sized to provide press fits in smaller holes 34 in a second end of the beams 12', 12". Center section 43 of the end blocks 14, 15 are narrower than the necks 42, but wider than necks 44, so they can be threaded through holes 32 in the beams 12', 12", but provide stops against the beams 12', 12" at holes 34. The only difference between end blocks 14 and 15 are at the insides, where end blocks 14 have through holes 16, while end blocks 15 have threaded holes 17 in their head sections 41, but otherwise are solid.

Figure 4A:
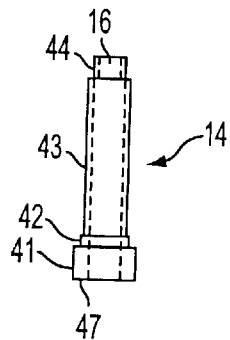
FIGS. 4A and 4B are lateral views of end blocks for the load cell shown in FIGS. 1 and 2.
Figure 4B:
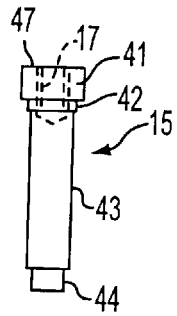

A load cell 10, according to preferred embodiments of the invention, is assembled from a pair of beams 12 as shown in FIG. 3, and pairs of rod shaped end blocks 14 and 15 as shown in FIGS. 4A, 4B. Strain gages 21 (or 23) and 22 (or 24) are bonded to each beam 12 as shown in FIG. 3 before a load cell 10 is assembled. There is no difference between beam 12' with strain gages 21, 22 and beam 12" with strain gages 23, 24 at this stage, so cutting of beams 12 and bonding of strain gages is preferably made for large batches of beams 12, before the assembly process, as is the machining of end blocks 14 and 15.

A pair of rod shaped end blocks 14 are first inserted into the large holes 32 in one beam 12 from the side opposite the strain gages, and their necks 42 are press fitted into the holes 32. This first part assembly defines beam 12". A pair of rod shaped end blocks 15 are next inserted into the large holes 32 in the second beam 12 from the side opposite the strain gages, and their necks 42 are press fitted into holes 32. This next part assembly defines beam 12'. Finally, beam 12" with end blocks 14 is turned so the necks 44 on end blocks 14 match holes 34 in beam 12', and the necks 44 on end blocks 15 match holes 34 in beam 12", as shown in FIG. 1, and the four necks 44 are press fitted into corresponding holes 34. It remains only to wire the strain gages together and provide a cable from the strain gages to external instrumentation, as is well known in the art. A connection pad to join the cable to the internal wiring can be mounted on top of the bottom beam 12" between the end blocks 14. The cable, the internal wiring, and the connection pad are not shown in FIG. 1.

FIGS. 1–3 depict a load cell 10 according to a preferred embodiment of the invention for a rated load of 15 kg in approximately full scale. The same design, with the same end blocks 14 and 15, is suitable for a range of rated load from 6 kg to 100 kg. Only the thickness "t" of the beams 12 and the width "w" of the narrowed center part 13 need be changed. The thickness "t" will vary from 0.063" to 0.190", and the width "w" of the center section will vary from 0.159" to 0.489" within this range of rated loads. Double bending beam load cells as shown in FIGS. 1 and 2 can be made for ratings below 6 kg and above 199 kg by changing other dimensions, but other load cell designs are usually more economical for ratings much smaller than 6 kg and much larger than 100 kg.

In the preferred embodiment of the invention illustrated and described above, the end blocks 14 and 15 are solid pieces of metal, and the head sections 41 have large end surfaces 47, so they provide stable support on the base 100 and against the load platform 200. Those skilled in the art will realize that the end blocks 14, 15 can also be made with narrow necks 44 on both ends of a center section 43, so holes 34 and 32 can have the same dimensions, and the end blocks need not be threaded through one beam, as described above. If larger contact surfaces 47 are desired in such a design, they can be obtained by adding rings to the necks protruding through the beams.

The mounting bolts in a low capacity double bending beam load cell can not always provide enough friction between the mounting surfaces 47 of the load cell 10 and the base 100 or load platform 200 to keep the load cell from moving sideways if it is subject to lateral forces. This problem can be avoided by forming the end surfaces 47 of the end blocks 14 and 15 with sharp protrusions, such as sawtooth patterns by knurling, which can dent the surface of the base 100 and the load platform 200 when the mounting bolts are tightened.

In the preferred embodiment of the invention described above, slip free joints between the end blocks 14, 15 and the beams 12', 12" are obtained by press fits between necks 42, 44 on the end blocks 14, 15 and holes 32, 34 in the beams 12', 12". In a press fit joint, there is positive prestress between the necks 42, 44 and the corresponding inner diameters of holes 32, 34 when the load on the load cell 10 is zero. When a load is applied to the load cell 10, the beams 12', 12" will bend and exert lateral forces against the necks 42, 44. These lateral forces can be taken up as shear in the necks 42, 44 without any initial slip in the joints, because there was already positive prestress between the necks 42, 44 and the holes 32, 34 before the load was applied. All deformation of a load cell 10 according to the preferred embodiments of the invention under load is accordingly elastic deformation in metal parts, as is the case in prior art double bending beam load cells machined from one block of metal. This removes the risk of creep and hysteresis from slip in the joints.

Press fit joints as described above are an inexpensive type of slip free joints for double bending beam load cells, especially for low load applications. For the purpose of describing the present invention, the term press fit shall be understood to include all forms of equivalent prestressed joints, such as shrink fit joints and cold expansion joints, in addition to simple press fit joints. For large capacity load cells 10, it may be advantageous to secure the tips of the end blocks 14, 15 to the beams 12', 12" by tack welding.

Figure 5:
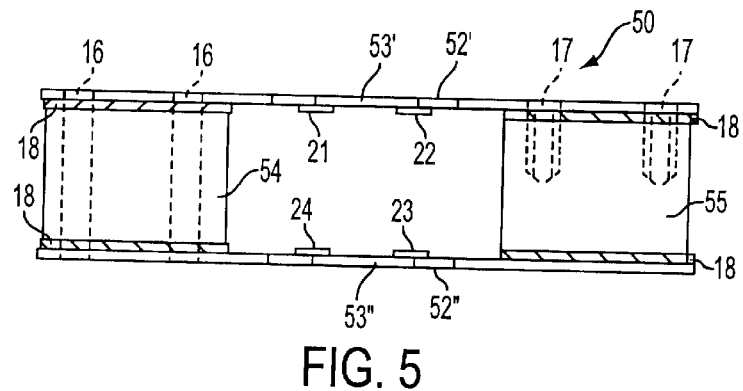
FIG. 5 is a side view of load cell according to a second preferred embodiment of the invention.
Figure 6:
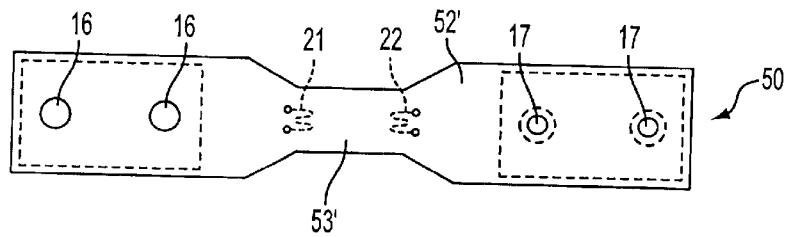
FIG. 6 is a top view of the load cell shown in FIG. 5.

FIGS. 5 and 6 illustrate a load cell 50 according to a second preferred embodiment of the invention. Load cell 50 also comprises two flat upper and lower bending beams 52', and 52", with narrowed center sections 53' and 53" respectively. Slip free joints between bending beams 52', 52" and end blocks 54, 55 in this case are provided by soldering or welding 18. Hard soldering or brazing are preferred soldering methods. Laser welding and plasma welding are preferred welding methods, because they cause less heat distortion of the bending beams 52', 52" than conventional welding methods. Tack welding may also be used if the material in the beams and the end blocks are compatible. In this case there is no need for necks protruding from the end blocks into the beams, so simple rectangular blocks of metal can be used as end blocks 54, 55, in place of pairs of rod shaped end blocks 14, 15 as described above for the first preferred embodiment. Hard soldering and laser welding are more costly processes than press fitting for low load ratings, but they become competitive for larger load ratings.

Figure 7:
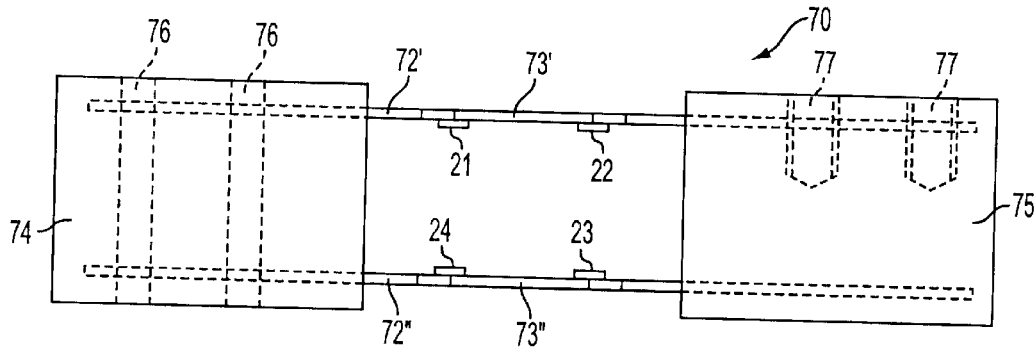
FIG. 7 is a side view of a load cell according to a third preferred embodiment of the invention.

A double bending beam load cell 70 according to a third preferred embodiment of the invention is shown in FIGS. 7 and 8. Load cell 70 also includes two bending beams 72', 72", with narrowed center sections 73' and 73" respectively. The bending beams 72', 72" are stamped or milled from a sheet of load cell quality aluminum or stainless steel alloy as described above, but end blocks 74 and 75 are formed by injection molding of plastic onto the ends of the bending beams 72', 72".

Figure 8:
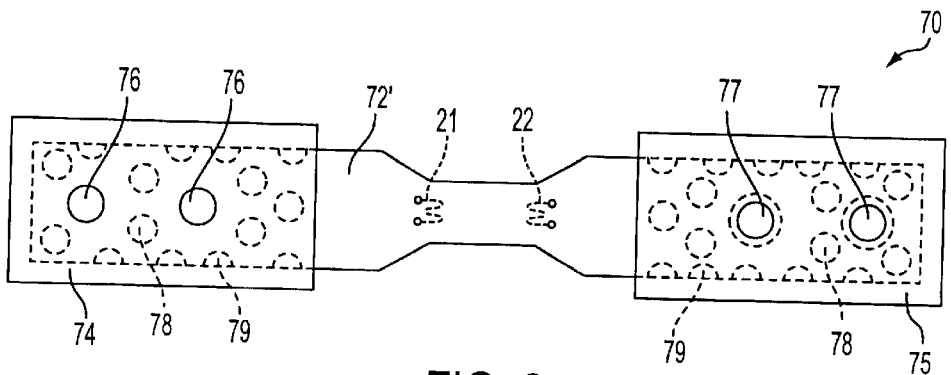
FIG. 8 is a top view of the load cell shown in FIG. 7.

Injectable plastic compounds with strength data similar to aluminum are readily available in today's market. Slip free joints between the metal bending beams 72', 72" and the injection molded plastic end blocks 74, 75 can be achieved by shaping the ends of beams 72', 72" as illustrated in FIG. 8. The ends of the bending beams 72', 72" are in this case formed with several holes 78 and/or scallops 79. During the injection molding process, the plastic material flows into the holes 78 and around the scalloped edges 79 under high pressure, so the holes 78 and scallops 79 are filled with high strength plastic. A typical injection molding material, such as polypropylene sulfide with 40% glass fiber for reinforcement, shrinks about 0.1% during curing. This causes prestress forces between the plastic material and the vertical edges of all scallops 79, as well as between the plastic and the vertical edges between holes 78. The prestressed contact areas between vertical surfaces in the beams 72', 72" and the plastic filling of the holes 78 and the scallops 79 provide slip free joints as described above in connection with the press fit joints in the load cell 10 shown in FIGS. 1–3.

If the plastic material should expand rather than contract during the curing process, it will expand inside holes 78 and inside scallops 79, thereby generating prestress forces prohibiting slip between the plastic end blocks 74, 75 and the beams 72', 72" as explained earlier.

Through holes 76 for mounting bolts in the left hand end block 74 are formed in the plastic during the molding process by inserts in the injection mold, with matching holes in the bending beams 72', 72". Threaded holes 77 for mounting of a load platform on the right hand end block 75 are formed by similar inserts in the mold. Alternatively, plain holes can be the plastic material are desired, the holes in the bending beam 72' can be made so small that part of the threads are cut in the metal beam 72'.

It is also possible to obtain slip free joints by bonding rectangular blocks of plastic to properly primed surfaces on metal bending beams, using bonding technology well known in the aerospace industry. Such a load cell is essentially equivalent to the double bending beam load cell 50 shown in FIGS. 5 and 6 above. The plastic end pieces may be molded to shape, including through holes and threaded holes, and including cavities for electronic interconnections, etc. before they are bonded to the bending beams. Such a design works well, but it is not cost competitive with double bending beam load cells with end blocks injection molded onto the ends of the beams as shown in FIGS. 7 and 8.

Figure 9:
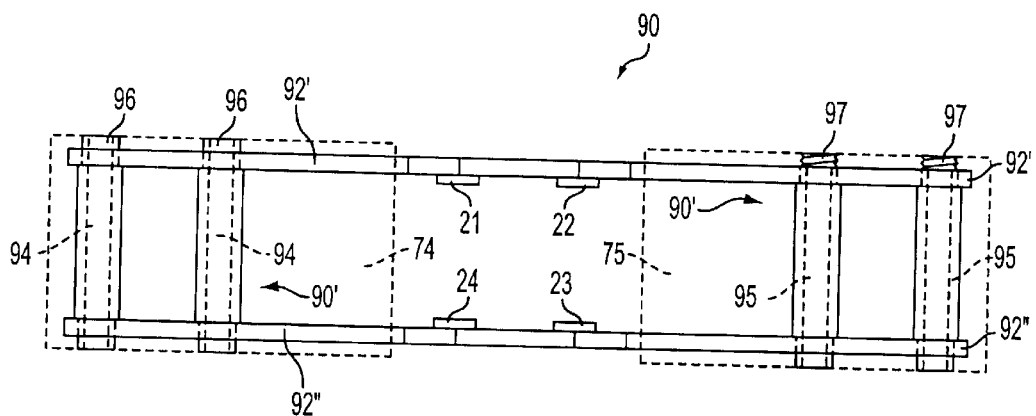
FIG. 9 is a lateral view of a load cell according to a fourth preferred embodiment of the invention, this load cell being a variation of the load cell shown in FIG. 7.

FIG. 9 shows a double bending beam load cell 90 according to a fourth preferred embodiment of the invention, which load cell combines features from the load cells of both FIGS. 1 and 2 and FIGS. 7 and 8. A pair of bending beams 92', 92" similar to bending beams 72', 72" in FIG. 7, are held together by two pairs 94 and 95 of metal spacers to form a metal skeleton 90'. This skeleton 90' is designed to be encased in end blocks 74 and 75 of plastic by injection molding, as explained above with reference to FIGS. 7 and 8. The spacers 94 are hollow and have through holes 96 for mounting bolts after the end blocks of plastic have been molded on, while spacers 95 have threaded holes 97 for mounting of a load platform. Holes in the bending beams 92' and 92" mating with the necks on the spacers 94, 95 are sized to provide press fits, so the spacers 94, 95 and the beams 92', 92" will be rigidly connected before the ends of the beams 92', 92" with spacers 94, 95 are inserted into a mold for injection molding of the plastic end blocks 74, 75. The advantages of this hybrid design is partly that the spacers 94, 95 can be made less expensive than the end blocks shown in FIGS. 4A and 4B, because they are supported by the plastic end blocks 74, 75 so they can not tilt, and partly that the spacers 94, 95 form ideal gripping surfaces for the plastic material in the end blocks 74, 75. A composite double bending beam load cell 90 with injection molded plastic end blocks 74, 75 over the metal skeleton 90' as shown in FIG. 9 is easy and inexpensive to make, and is very stable.

In order to provide improved resistance to lateral movement between the end blocks 74, 75 in load cells 70 or 90 and the load cell base 100 and the load platform 200, sharp edges that can dent the contact surfaces may be applied to the contact surfaces of the end blocks 74, 75.

The external shape of the end blocks 74, 75 is determined by the mold used during the injection molding process. The mold may include protrusions on the inside in non-critical parts of the end blocks 74, 75, as is well known in the art, both to ensure even curing of the plastic material, and also to reduce the amount of plastic used. The pockets formed in the finished end blocks 74, 75 by such protrusions in the mold are not shown in FIGS. 7 and 8, because their depiction would obscure details important for the understanding of the invention.

Injection molded end blocks 74, 75 also provide an inexpensive way to provide cavities for housing of interconnections between individual strain gages, and to trim resistors, amplifiers, A/D converters, etc., as will be readily understood by those skilled in the art. Such cavities are also not shown in FIGS. 7 and 8.

A double bending beam load cell 70 as shown in FIGS. 7 and 8, with or without a metal skeleton 90' as shown in FIG. 9, can be included as parts of other kinds of load cells in accordance with yet further embodiments of the invention, as shown in FIGS. 10–13.

FIG. 10 is a side view of an in-line load cell 300, also known as an "S"-beam load cell, for measurement of tension or compression forces along an axis 310. The load cell 300 is simply a double bending beam load cell 70 or 90 as shown in FIGS. 7, 8 and 9, with enlarged end blocks 314, 315 having fold-back arms 314' and 315' below and above the bending beams 312', 312". Slip free joints between beams 312', 312" and the end pieces 314, 315 are obtained as described above for load cells 70 or 90. Threaded holes 330', 330" in the end pieces 314, 315 are connection points for applied loads. Basically, the enlarged end block 314 with fold-back arm 314' combines the mounting end block 74 and the associated base 100 in the previously described double bending beam load cell 70, and the enlarged end block 315 with fold-back arm 315' combines the load platform 200 and its associated end block 75. Screws 340' and 340" serving as overload stops are mounted in threaded holes 345', 345" injection molded in the end blocks 314, 315. The screws 340', 340" extend through free holes 346', 346" in the opposing fold-back arms 314', 315'. Screw heads 341', 341" will limit the travel of the fold-back arms 314' and 315' when the load cell 300 measures tension, and nuts 342', 342" will limit the travel of the fold-back arms 314', 315' when the load cell 300 measures compression. The lower fold-back arm 314' could have a recess for the screw head 341', so it can rest flat on a support surface. FIG. 11 is an end view of the load cell 300, showing fold-back arms 314', 315' that are wider than the end blocks 314, 315. This increases the strength of the fold-back arms and provides a larger support surface if the load cell 300 should rest on a flat support. The overload screws 341', 341" with associated screw heads and nuts are omitted from FIG. 11.

Apart from the different load application arrangement, the load cell 300 is equivalent to a load cell 70 or 90 described above.

FIGS. 12 and 13 show a double ended double bending beam load cell 400. This type of load cell is used in cases where the load application point is subject to large lateral forces, or in applications where the bending moments applied to the mounting components are too large for a Single Point load cell. The load cell 400 in essence comprises two double bending beam load cells 70 or 90 arranged end to end. A pair of end blocks 414' and 414" at the far ends of the load cell 400 serve as mounting blocks, corresponding to end blocks 74 in FIG. 7, while a centered block 415 serve as a load application point, similar to end block 75 in FIG. 7. Two pairs of bending beams 412', 412" and 412''', 412'''' connect the end blocks 414' and 414" with the center block 415. Slip free joints between the beams 412'–412'''' and the blocks 414', 414" and 415 are obtained as explained above for load cells 70 and 90, by holes 478 in the bending beams 412'–412'''' and/or scallops 479 in the edges of the bending beams. It would be possible to use separate bending beams for the left side and the right side of the load cell 400, but beams 412' and 412''' are usually combined into one long beam as indicated in FIGS. 12 and 13, and beams 412" and 412'''' are similarly combined into another long beam, because this provides a mechanically stronger load cell 400.

Each pair of the bending beams 412'–412'''' have strain gages 21'–24' and 21"–24" bonded as described with reference to FIGS. 1 and 2 above, for a total of eight strain gages. All eight strain gages are connected in a single bridge circuit providing a signal proportional to the load on the center block 414, as is well known in the art. A cavity for electrical connections, trimming resistors, etc. is formed in at least one of the end blocks 414', 414" during the injection molding process, but it is not shown in FIGS. 12, 13.

When a double ended dual beam load cell 400 is loaded, using hole 417 to mount a load platform thereon, the deflection of the bending beams 412'–412'''' will cause a slight shortening of the distance between mounting holes 416' and 416". Only one end of load cell 400 should accordingly be firmly fastened to a base 100, while the other end of the load cell should be allowed to move slightly, at least in high accuracy applications, as is well known in the art. Metal inserts (not shown) in the bottom of the end pieces 414' and 414" will facilitate this type of mounting.

Apart from the mounting and load application arrangement, a dual load cell 400 functions and performs the same way as the single ended double bending beam load cells 10, 50, 70, or 90 described above.

Double bending beam load cells 10, 50, 70, 90, 300, and 400 according to the preferred embodiments of the invention have the same accuracy as a prior art double bending beam load cell machined from a single block of load cell quality alloy, but the cost of manufacturing it is only a fraction of the prior art load cell cost. The cost savings are achieved mainly by using less costly material and significantly less costly machining. The application of the strain gages to the flat and accessible beam surfaces, and curing of the strain gage bonds in large quantities also are great cost savers compared to the prior art. The accessibility of the bonding areas on the unmounted beams also improves the accuracy of the positioning of the strain gages on the beams, which reduces the sensitivity to the point of load application. The invention thus offers very substantial and unexpected benefits in the load cell market.

The scope of the invention shall not be limited by any statement in the text above, nor by any detail of the accompanying figures. All the examples and embodiments described above assume that the material in the bending beams is a load cell quality metal alloy, but the invention will work equally well with any other load cell quality material that can be formed into bending beams, including plastic or glass, as long as the material has properties suitable for strain gage measurements.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A double bending beam load cell comprising: two parallel bending beams of load cell quality material, at least two separate end blocks of less expensive material to maintain a fixed spacing between said bending beams, and slip free joints to join said end blocks and said bending beams, wherein said bending beams are cut from a flat piece of load cell quality metal, and wherein said end blocks are metal rods with necks press fitted in holes in said beams.

2. A double bending beam load cell according to claim 1, wherein said rods have ends with sharp edges to resist lateral movement relative to mounting surfaces.

3. A double bending beam load cell comprising: two parallel bending beams of load cell quality material, at least two separate end blocks of less expensive material to maintain a fixed spacing between said bending beams, and slip free joints to join said end blocks and said bending beams, wherein said end blocks are made from plastic, wherein said bending beams are cut from flat material, and said end blocks are injection molded onto the ends of the beams, and wherein the ends of the beams have multiple vertical surfaces mating with the injection molded end blocks.

4. A double bending beam load cell comprising: two parallel bending beams of load cell quality material, at least two separate end blocks of less expensive material to maintain a fixed spacing between said bending beams, and slip free joints to join said end blocks and said bending beams, wherein said end blocks are made from plastic, wherein said bending beams are cut from flat material, and said end blocks are injection molded onto the ends of the beams, and further comprising metal rods with necks press fitted in holes in said beams inside said plastic end blocks.

5. A double bending beam load cell comprising: two parallel bending beams of load cell quality material, at least two separate end blocks of less expensive material to maintain a fixed spacing between said bending beams, and slip free joints to join said end blocks and said bending beams, wherein said end blocks are made from plastic, wherein said bending beams are cut from flat material, and said end blocks are injection molded onto the ends of the beams, and further comprising material with sharp edges protruding from said end blocks to resist lateral movement relative to mounting surfaces.

6. A double bending beam load cell comprising: two parallel bending beams of load cell quality material, at least two separate end blocks of less expensive material to maintain a fixed spacing between said bending beams, and slip free joints to join said end blocks and said bending beams, wherein said end blocks are made from plastic, wherein said bending beams are cut from flat material, and said end blocks are injection molded onto the ends of the beams, and wherein said end blocks are extended to form fold-back arms, thereby forming an in-line load cell.

7. A double bending beam load cell according to claim 6, comprising a pair of spaced apart mounting end blocks and a load application block centered between said pair of mounting end blocks, thereby forming a double ended bending beam load cell.

* * * * *